June 9, 1964  K. P. ISSBRÜCKER  3,136,329
PRESSURE REGULATOR FOR PNEUMATIC MEASURING APPARATUS
Filed Aug. 14, 1958
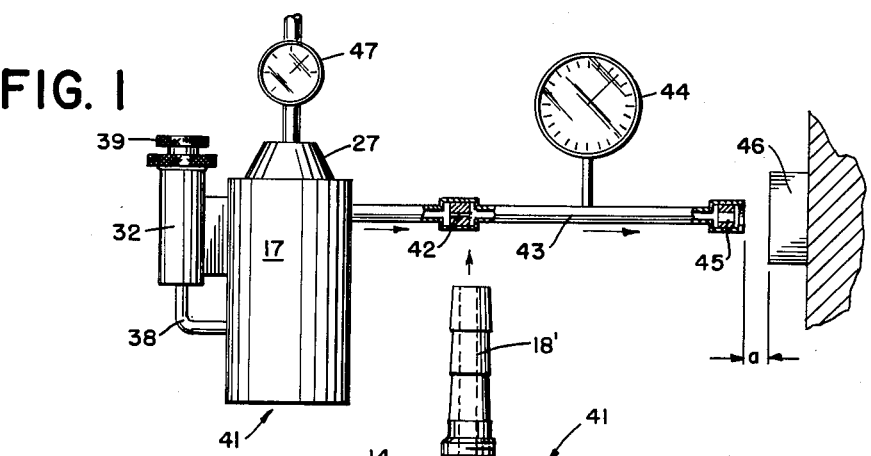
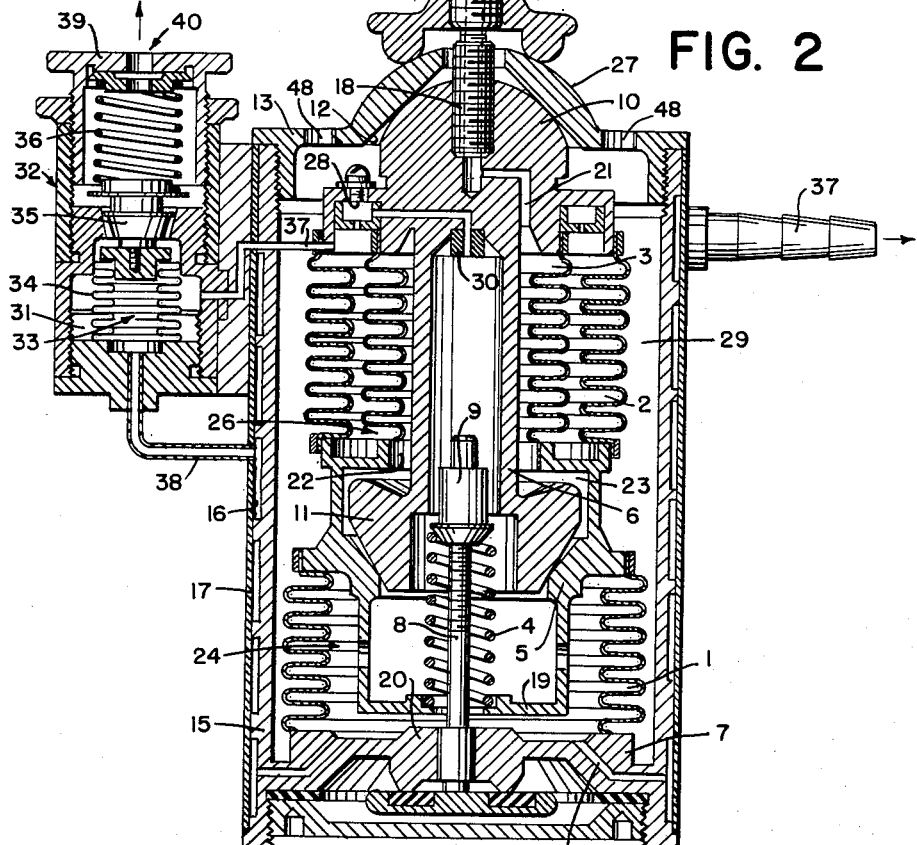
INVENTOR.
KURT PAUL ISSBRÜCKER United States Patent Office 3,136,329
Patented June 9, 1964

3,136,329
PRESSURE REGULATOR FOR PNEUMATIC
MEASURING APPARATUS
Kurt Paul Issbrücker, Crimmitschau, Germany, assignor to VEB Massindustrie Werdau, Werdau, Saxony, Germany
Filed Aug. 14, 1958, Ser. No. 755,043
15 Claims. (Cl. 137—338)

This invention relates to apparatus for pneumatic linear measurement, and more particularly to a regulator for maintaining the pressure of the flowing gases constant during such pneumatic measuring.

As is well known, the quality of pneumatic measuring of this type depends upon the degree to which the regulator is capable of maintaining the supply gas for the measuring device under constant pressure. It is immaterial whether the measured value of the indicating instrument is derived as a function of the variable gas pressures existing between the entry nozzle and the measuring nozzle of the instrument, or whether the measured value is a function of the volume of gas flowing from the measuring nozzle during a given time, as an equivalent of the flow velocity.

Some conventional regulating devices of this type are built on the principle of hydrostatic columns, and operate to maintain a constant gas pressure within a range, the lower limit of which extends almost to zero pressure, because of immersed pipes through which compressed air flows and which are easily maintained at a constant depth of immersion. Since the height of the hydrostatic column housing is limited by considerations of convenience, the pressures of the gases leading to the entry nozzles of the measuring device are controllable only to a few hundred millimeters of water. This is not sufficient for bridging purposes and for linearizing of measuring ranges much greater than 0.1 millimeter, as is required for pneumatic measurement on production machines.

An adjustable gas choke is often provided in pneumatic distance measuring devices working on the flow-through principle, in order to avoid the difficulties of regulating higher gas pressures to the usable consistency necessary in covering larger measuring ranges. By means of such a choke, the zero mark of the indicator is constantly adjusted manually, according to the variations in gas pressures existing in front of the head nozzle.

Distance measuring devices based on the differential principle work with variable pressures independent of the supply pressure. This is accomplished by directing two gas streams in parallel and connecting them with an indicating instrument in the manner of a Wheatstone bridge. By this method, however, a hand-actuated or motor-actuated device is necessary to adjust the bridge to its zero position.

Other gas pressure regulating devices which may be used as pre-regulators in pneumatic distance measurement are, for example, regulators in which spring-loaded pistons or valves control the cross-section of the head nozzle passage openings of the supply gas. This is accomplished by means of membranes or tallow-boxes, which is acted upon by the counter-pressure which exists before the head nozzle. As this pressure is equivalent to the spring pressure acting on the piston or valve, the variable corresponds, or is proportional, to the size of the gas passage opening, which in turn depends on the volume of gas emerging from the measuring nozzle per unit of time; and further depends on the pressure of the gas fed to the regulator, because of the pressure gradient which changes the choke coefficient. The deviations from the constant, however, of the regulated pressure are too large to allow for distance measuring with the necessary exactness.

These shortcomings of the usual gas regulation method can be avoided if one abandons the conventional concepts of establishing a purely static equilibrium between the spring loaded control member of the gas passage opening and the pneumatic counter load. According to the invention herein, a dynamic equilibrium is established. A control member is provided which is free from mechanical friction and is coupled on both ends to resilient chambers or membranes on which the gas pressure acts in opposite directions. The floating state of the control member will not be influenced by the variable pressures of the gas which is fed through the regulator.

In accordance with the gas pressure regulator of the invention, the size of the gas passage opening is variable and is dependent upon the frequency and amplitude of the oscillations of the control member. The frequency of the oscillations is in turn dependent upon the difference in pressure prevailing in the chambers. The amplitude of the oscillations is determined by the mass of gas flow per unit of elapsed time. As a result of the oscillations of the control member, the average of the oscillating pressure is maintained constant by the regulator.

Other objects and advantages to the invention will be apparent during the course of the following specification when taken in connection with the accompanying drawings which illustrate a practicable example of the invention, and in which FIG. 1 is a schematic view of a pneumatic measuring device incorporating the pressure regulator of the present invention; and FIG. 2 is a central vertical section through the pressure regulator of the invention in which the gas passage port is controlled by a conical valve member.

FIG. 1 shows schematically the measuring device and the pressure regulator of the invention. Gas of variable pressure is supplied by the usual air compressor (not shown) through a reduction valve 47 to a pressure regulator 41. The latter is constructed, as will be presently described, to regulate the variable-pressure supply gas to the necessary working pressure with absolute constancy, whereby the constant gas pressure may be utilized for pneumatic length measurements. As an example, supply gas pressure variations of from four to seven atmospheres may be regulated to a constant pressure of three atmospheres.

The gas under constant pressure flows from the regulator 41 through a head nozzle 42 into a gas measuring conduit 43 which is connected to an indicator 44. From the conduit 43, the gas flows through a measuring nozzle 45 and is then directed against a measuring object 46 which is spaced from the measuring nozzle 45 by distance $a$. The opening of the head nozzle 42 is appreciably smaller than the opening of measuring nozzle 45, as shown in FIG. 1.

The prevailing pressure in advance of the head nozzle 42 equals the pressure held constant by regulator 41. However, the gas pressure in the measuring conduit 43 between head nozzle 42 and measuring nozzle 45 depends upon the distance $a$, since the opening of the head nozzle 42 is smaller than the opening of the measuring nozzle 45. Deviations from the nominal distance of the testing object 46 result (within the limits $a$) in equivalent variations in pressure in conduit 43, as indicated on indicator 44. The determining unit of the quantitative variations of gas pressure in conduit 43 in varying distance $a$, for example, by .01 mm., is the difference in size of the measuring and head nozzles.

It will be evident from the above that the precision in measurement depends mainly on the quality of the constancy to which the regulated gas pressure is held. In addition, the object may be of any shape or size so that it is possible to achieve pneumatic measurement of shafts, bores, gear wheels, cam shafts, control elements, concave and convex bodies, thicknesses of bands, foils, etc.

The gas regulator 41, shown in detail in FIG. 2, contains three longitudinally-expansible bellows chambers 1, 2, and 3 which are connected to a central valve assembly. The valve assembly includes a fixed upper valve member comprising a lower cone-shaped valve 11 carried by a support tube 6. The support tube 6 is rigid with a top valve portion which has an upper spherical head 10.

The pressure regulator has a closed hollow housing formed by a cylindrical wall or envelope 15, a bottom wall portion 7, and a top wall or cover 13. The upper valve member is fixedly secured to the cover 13 in a manner which will be presently described. Inner space 29 of the envelope 15 communicates with the atmosphere through apertures 43 provided in cover 13.

The valve assembly also includes a lower valve portion comprising a valve seat portion 5, and a depending casing 19 carried by said valve seat portion. This lower valve member is mounted for free floating movement on the ends of the bellows 1, 2, and 3, so that upward movement of the lower valve portion will bring the valve seat 5 into a closed valve position with the valve 11 and downward movement will correspondingly open the valve. The bellows 2 and 3 are connected at their top ends to the fixed and immovable upper valve member, and at their bottom ends to the movable valve seat portion 5.

The bellows 1 is connected at its top end to the valve seat portion 5 and at its bottom end to the fixed housing bottom wall 7. It will thus be observed that expansion of the bellows 1 will tend to raise the valve seat 5 into a closing position of the valve assembly while expansion of the bellows 2 and 3 will tend to lower the valve seat 5 into an opening position of the valve assembly.

The housing cover 13 has a central dome which is provided with a spherical outer surface 27 and a conical inner surface 12. The spherical head or top end 10 of the upper valve member rests against the conical inner surface 12 of the cover dome and is held in this position by a screw cap 14. The screw cap 14 makes a threaded connection with an inlet port 18' which is continuous with a gas entry conduit 18 fixedly secured to and extends upwardly from the spherical head 10.

The valve seat 5 is biased in a downward direction by a compression spring 4 which is seated on the bottom wall of the valve seat casing 19. The tension of compression spring 4 is adjustable by a screw bolt 8 and a nut 9. The cylindrical housing wall or envelope 15 is provided with a helical groove or channel 16 which extends between the top and bottom thereof and is covered by the sleeve 17 to provide a closed gas channel.

Prior to the introduction of gas under pressure through the inlet port 18' and the gas conduit 18, the valve seat casing 19 rests upon a fixed central support 20 which is a portion of the bottom wall assembly. In this position, the valve seat 5 is separated from the cone valve 11, so that the valve assembly is in its open position. In this open position, the spring load on the valve seat 5 provided by spring 4 need not exceed double the force necessary to fully extend the three bellows 1, 2, and 3 axially. The range of extension and contraction of the bellows 1, 2, and 3 is also the range of the opening and closing of the valve assembly from its fully opened position.

Since the valve 5, 11 is held open by the spring 4, the gas introduced under pressure into the inlet port 18' and conduit 18 enters the interior of the regulator and passes through a channel 21 which connects the conduit 18 with a pressure chamber 22 formed within the interior of the bellows 3.

The gas then flows through a restricted passageway 23 between the top end of the valve seat portion 5 and the conical valve 11, to a valve control chamber 24 formed in the interior of the bellows 1. From this valve control chamber 24, the gas passes through an opening 25 in the bottom of the spiral channel 16 in which the temperature of gas is equalized to the atmospheric temperature in passing upwardly through the spiral channel 16. After passing through an outlet port 37 the gas is conducted to the measuring nozzle 45 of the measuring instrument, and escapes into the free atmosphere.

As the gas is introduced under pressure into the chamber 24, a part of the gas enters through a nozzle 30 into a counterpressure chamber 26 which is formed within the bellows 2. The cross-section of the nozzle 30 is several times smaller than that of the head nozzle 42, and the pressure in the counterpressure chamber 26 is equal to the pressure in the chamber 24. The pressure in both chambers will, however, increase due to the opening of the head nozzle 42 being several times smaller than the opening between the valve parts 5 and 11. The active gas pressure in the counter pressure chamber 26 is an additive to the force of spring 4, and together with this spring force acts against the pressure in chamber 24 which urges the valve 5 upwardly to the closed position of the valve assembly.

The pneumatic counter pressures of the gases acting in chambers 24 and 26, in combination with the resilient free suspension of the valve portion carried by the bellows 1, 2, and 3, which bellows define chambers 22, 24, and 26, represents a sensitive longitudinally oscillating system. This system is set in oscillating motion even by the fine pressure impulses caused by friction of the gases passing through the valve opening against the valve seat, and by turbulence. These oscillations persist throughout the duration of the gas flow.

The constantly varying amount of gas flow through the restricted opening 23, which decreases and increases in proportion to the opening and closing of valve 5, 11 helps to maintain the aforementioned oscillations; however the opening 23 is never decreased to zero, so as to prevent the top of the valve cone 11 from striking the upper surface of the valve seat portion 5. Thus the frequency of the oscillation is dependent not only on the self-resonance of the oscillating system, but also on velocity of flow of the gas in the valve opening, which is a function of the prevailing difference of pressures in the opening.

A change in the distance $a$ of the measuring nozzle 45 from the testing point 46 also results in a change of the exit velocity of the pressure gases leaving the head nozzle 42, which retroactively corresponds to differently flowing gas masses. The mass of gas flowing through the head nozzle 42 is exactly equal to the mass flowing from chamber 22 into chamber 24. Since the oscillating system is sensitive to variations in pressure, such pressure variations cause oscillating opening and closing movements of the valve member 5 and consequently variations in the velocity of the gas flow.

Thus, the amplitude of oscillation of the valve member 5 is dependent upon the mass of the gas flowing through the valve opening between the valve parts 5 and 11. Therefore, the valve member 5, which oscillates at a high frequency under the influence of the kinetic energy of the oscillating gas masses, creates a passage opening which assures a gas flow which is practically unrestricted by the throttling effect of the valve parts, therefore no back pressure is created, i.e. a flow free of reaction takes place.

Due to the dependence of the opening of the valve upon the amount of gas flow, the spring load upon the valve seat 5 also varies with the latter. The magnitude of the gas pressure in chamber 24 is thus varied. The pressures in chambers 24 and 26 operate against one another in a manner such that the pressure in chamber 24 practically becomes a constant value. If, for example, the pressure load operating in the chamber 24 upon the valve seat 5 is increased, then the pressure load operating in the chamber 26 upon the valve seat 5 is decreased by the same amount as the force absorbed by the spring 4.

The gas fed to the regulator from the pressure source or compressor varies between a maximum and a minimum working pressure according to the circuit system controlling the compressor. In order to avoid the influence of this pressure difference on the oscillating state of the valve seat 5, considering the difficulty in holding the nozzle supply gas constant, so necessary for exact measurement, the above-described pressure gas chamber 22 is provided. The diameter of the valve seat opening 5 corresponds to the external diameter of the active counter pressure surface in chamber 22.

In order to further improve the gas pressure regulation and to obtain the highest efficiency, the regulating action must be effected without any mechanical friction. According to the invention, this requirement is met by adjusting the concentric position of valve support cone 11 relative to the valve seat 5 during the regulating process. This is done by means of the ball joint suspension of the valve support tube 6 in a ball seat provided by the conical top wall inner surface 12 in which the spherical head 10 is seated. The valve cone 11 is secured centrally within the valve seat against displacement by the screw cap 14 which bears against the spherical top surface 27 of the dome of cover 13, the center of which spherical surface is aligned with the supporting ball.

If the regulator supplies several measuring nozzles with pressure gas, the amplitude of the oscillation of valve seat 5 becomes prohibitively large and may result in rapid wearing out of the valve seat. To prevent this, the chamber 26 may be partially filled with liquid, for example oil, through a filling opening 28. This oil acts as an energy absorber within the surfaces of the bellows 2 and 3, and thereby reduces the amplitude to the desired size. The oscillation damping liquid may also be placed in space 29.

Where the mass of gas flowing within the regulator is increased as a result of several measuring nozzles to be supplied simultaneously, the variable pressure drop caused by the spring load against the nominal pressure is no longer without influence on the measuring result. In this connection, this shortcoming may be circumvented if the control member 5 is not biased pneumatically by the gas pressure in chamber 24, but the pressure chamber 26 is connected to a second regulator in which a gas mass, sufficiently small to maintain the nominal pressure, is permitted to flow. This second regulator is not subjected to continuously variable choking or gas restriction as is the measuring regulator. In this arrangement, the pneumatic pressure load on the valve seat 5 is independent of the oscillation amplitude, and an additional loading of the valve seat 5 by spring 4 is necessary. The bellows 1 and 2 may also be made of equal size.

The transfer of the pressure gas from the chamber 24 into the chamber 26 is effective through the nozzle 30 of a small bore, and chamber 26 is in communication with chamber 31 of a pressure release valve 32 through a conduit 37. A gas tight chamber 33 bears against a spring 36 by means of a resilient membrane or bellows 34 having a closure member 35. The chamber 33 is supplied with gas flowing to the head nozzle in the spiral conduit 16 through a conduit 38. The regulated gas pressure in chamber 33 is opposed by the spring 36, which spring is adjustable by means of a threaded sleeve 39 so that closure member 35 will never close completely, but a small quantity of gas is always allowed to escape through an outlet opening 40 to the atmosphere. Even small increases of gas pressure over the desired nominal output pressure will be prevented, particularly where there are small distances between the measured objects or testing point 46 from the opening of measuring nozzle 45.

The pressure release valve 32, in cooperation with the active gas pressure in chamber 26, thus avoids sustained pressure peaks which would prevent a constant output of the regulated pressure. These pressure peaks are caused by rotary oscillation of the valve seat 5, by variation in load on the spring 4, and particularly by the large restriction in the volume of gas flowing from the measuring nozzle 45 because of the small distance $a$ to the measuring object 46. Pressure changes in chamber 33 causes variations in the release of gas permitted by the movable closure member 35, which in turn regulates the gas pressure in counter-pressure chamber 26.

However, changes in atmospheric pressure do not cause a sudden reaction in the positioning of the valve seat 5. The effects of these changes are transmitted to both sides of seat 5 into chambers 24 and 26, and are diminished by the ratio of the forces exerted by the pressures in these chambers. This ratio can be held within technically practical limits, and together with the atmospheric pressure on the measuring nozzle opening as a counter force, insures a precise measurement wherein variations do not occur as a result of changes in atmospheric pressure.

Since ambient atmospheric pressure changes constantly, barometric pressure changes would influence the constancy of the pressure gas supplied to head nozzle 45, were it not for the counter-balancing chamber 26. Because of the presence of chamber 26, the barometric pressure variation within space 29, surrounding said chamber, acts against the constancy of the regulated gas pressure only in accordance with the pressure-sensitive surfaces of chambers 24 and 26. In the illustrated practicable example of the inventive pressure regulator, these surfaces are unequal in size, and the atmospheric pressure acts simultaneously upon the outflow of gas through the nozzle 42 and the outflow passing from valve 35 through the opening 40.

While a preferred embodiment of the invention has been illustrated and described herein by way of example, it is obvious that numerous additions, changes and omissions may be made in this embodiment without departing from the spirit and scope of the invention as defined in the appended claims.

What is claimed is:

1. A gas pressure regulator comprising a housing having a gas inlet, a gas outlet, and a gas passage circuit joining said inlet and outlet, a valve opening between the gas inlet and outlet, a restricted gas passage opening between the inlet and outlet and communicating with the valve opening, a movable valve member in said valve opening, a pair of gas chambers communicating with said outlet and responsive to pressure in said outlet, said chambers having resilient walls capable of expanding and contracting in length, a first of said chambers forming a part of the gas passage circuit from the valve opening to the outlet, the gas chamber walls being connected to opposite ends of said valve member and supporting the latter, the second of said chambers having an inlet port smaller than said gas outlet in said housing to produce a pressure differential across said valve member, the first of said chambers acting against a greater area than the second chamber, the gas chambers biasing the valve control member in opposite directions for longitudinal oscillating movement in response to pressure differences in the respective gas chambers, the valve member during said oscillating movement controlling the respective valve opening and restricted gas passage opening in inverse relation whereby one of said openings is decreased in size while the other is increased, the oscillating movement of the valve member being induced by impulses imparted to said valve member by gases flowing through the valve and restricted openings, and supplemental biasing means coupled to and acting upon said valve member to open said valve opening.

2. A gas pressure regulator according to claim 1 in which the valve member is pneumatically biased at one end by the regulated gas pressures in one of said gas chambers, and is mechanically biased at the other end by said biasing means.

3. In a gas pressure regulator having a housing, a gas inlet to said housing, a gas outlet from said housing, a variable gas passage between said inlet and said outlet including a stationary member and a movable member reciprocable between extreme positions opening and cutting off gas flow and adjustable to median positions for restricted flow, means suspending said movable member for oscillatory movement, said suspending means including first pressure duct means between said outlet and said gas passage, the gas acting against one area of said movable member urging said movable member toward one extreme position in response to the outlet pressure, and second duct means between said outlet and said gas passage, the gas acting against a second smaller area of said movable member to urge said movable member toward the other extreme position in response to the gas pressures at the outlet so that said duct means produce a pressure differential across said member; and resilient means biasing said member toward the other extreme position.

4. In a gas pressure regulator having a housing, a gas inlet in said housing, a gas outlet in said housing, a valve opening between said gas inlet and said gas outlet, a restricted gas passage opening between said inlet and said valve opening and communicating with said valve opening, a reciprocably movable valve member positioned relative to said openings to control the magnitude of said openings in inverse relation, resilient means adapted to bias said valve member to open said valve opening, a pressure chamber connected to and supporting said movable valve member and urging movement of said valve member to restrict said valve opening in response to gas pressures between said valve opening and said outlet, a supplementary chamber connected to and suspending said movable valve member and urging said movable valve member to restrict the opening of said restricted gas passage in response to pressures between said valve opening and said outlet, and means for said pressure chamber being effective to produce a greater urging force than said supplementary chamber whereby a force differential exists across said movable member.

5. A gas pressure regulator comprising a housing, an inlet in said housing, an outlet in said housing, a stationary valve member in said housing having a pair of valve surfaces, a movable valve member having a valve seat for movement with respect to said stationary member, a first gas chamber positioned on a first surface of said movable valve member including flexible side walls secured to said movable valve member to urge the valve seat against the stationary member, spring means connected to said housing and said movable valve member urging said movable valve member in the direction of the first surface, a second chamber including flexible side walls connected to a second opposite and smaller surface of said movable valve member opposite said first surface, said second chamber suspending said movable valve member within said housing, a variable gas passage between said inlet and said outlet defined by said stationary valve member and said movable valve member, said first chamber being positioned along the gas passage between said valve members and said outlet, duct means connecting said first chamber to said second chamber, whereby pressure in said first chamber urges said movable valve member against said second chamber and pressure in said second chamber urges said movable valve member against said first chamber, and release valve means connected to said second chamber for responding to the outlet pressure of said regulator.

6. A gas pressure regulator as set forth in claim 5, further comprising a spiral conduit in said housing for a gas passage between said first chamber and said outlet.

7. A gas pressure regulator as in claim 6, wherein said stationary member includes a stem depending from the inlet of said housing, an inverted mushroom shaped head on said stem, and said movable valve member includes a cylindrical shell and annular projections on said shell spaced from said mushroom-shaped head.

8. In a gas pressure regulator as set forth in claim 7, wherein said stem includes a spherical upper end, wherein said housing includes an interior conical surface at the top of said housing, and means securing said spherical stem head to said conical inner surface for radial adjustment of said stationary member.

9. A gas pressure regulator comprising, a housing having a gas inlet opening and a gas outlet opening and defining a variable gas passage between said inlet opening and said outlet opening; dynamic gas control means in said housing for regulating the flow of gas through the passage including a valve having a fixed member and a movable member, and resilient means for urging said movable member to open said valve; a first pressure chamber immediately responsive to the pressure at said outlet opening and acting upon a first surface area of said movable member for urging said movable member to close said valve, a second pressure chamber acting upon a second smaller surface area of said movable member for urging said movable member to open said valve and having nozzle means smaller than said outlet opening for communicating with said outlet opening, whereby a pressure differential is produced across said movable member in response to the movement of said movable member.

10. A gas pressure regulator as in claim 9 further comprising a pressure release valve for releasing sustained pressure peaks formed during the regulating operation, said pressure release valve comprising a gas passage connected to said second chamber and communicating with the outside atmosphere.

11. A gas pressure regulator as in claim 10 wherein said second chamber has a release valve opening and includes a closure member located in said release valve opening, spring means biasing said closure member toward a partially closed position of the release valve opening, and a third chamber having flexible walls coupled to said closure member and communicating with the first chamber, whereby gas pressure from said first chamber biases said closure member toward an opened position, the gas passage permitting pressure gas to escape from the second chamber to the outside atmosphere past the closure member in small quantities.

12. A gas pressure regulator as in claim 10 further comprising means for introducing a dampening fluid into said second chamber.

13. A gas pressure regulator as in claim 9 further comprising an auxiliary regulator, connecting duct means connecting said auxiliary regulator to said second chamber for pressure control of said second chamber, and means in said auxiliary regulator for responding to the outlet pressure of said gas.

14. A gas pressure regulator comprising, a housing having a gas inlet opening and a gas outlet opening and defining a variable gas passage between the inlet and the outlet openings; dynamic gas control means in said housing for regulating the flow of gas through the passage including an oscillating valve having a fixed member, a movable member, and resilient means for urging said movable member to open said valve; a first pressure chamber in the passage between the inlet opening and the outlet opening on the outlet side of said valve, said first pressure chamber acting upon a first surface of said movable member for urging said movable member to close said valve, a second pressure chamber acting upon a second and smaller surface area of said movable member for urging said movable member to open said valve and having nozzle means smaller than said outlet for communicating with said outlet, whereby pressure response of said second chamber is such as to produce a pressure differential across said movable member in response to opening and closing of said movable member.

15. A gas pressure regulator comprising, a housing having a gas inlet opening and a gas outlet opening and defining a variable gas passage between the inlet and outlet openings; dynamic gas control means in said housing for regulating the flow of gas through the passage including a valve having a stationary member, an oscillatable member and resilient means for biasing said oscillatable member to open the valve; and a pair of pressure chambers in the housing each acting on opposite sides of said oscillatable member upon surface areas of different size on the oscillatable member and having means for communicating with the outlet opening, each communicating means being a different size for each chamber whereby a pressure differential may be created across said oscillatable member in response to operation of the oscillatable member.

References Cited in the file of this patent

UNITED STATES PATENTS

| | | |
|---|---|---|
| 740,704 | Singer | Oct. 6, 1903 |
| 942,042 | Petley | Nov. 30, 1909 |
| 2,476,175 | Baker | July 12, 1949 |
| 2,484,850 | Paget | Oct. 18, 1949 |
| 2,808,068 | Thomas | Oct. 1, 1957 |

FOREIGN PATENTS

| | | |
|---|---|---|
| 294,955 | Switzerland | Feb. 16, 1954 |